(12) United States Patent
Blount et al.

(10) Patent No.: US 8,121,993 B2
(45) Date of Patent: Feb. 21, 2012

(54) DATA SHARING AND RECOVERY WITHIN A NETWORK OF UNTRUSTED STORAGE DEVICES USING DATA OBJECT FINGERPRINTING

(75) Inventors: Joseph Blount, Andover, KS (US); Charles Binford, Wichita, KS (US); Stacy Lee Maydew, Frederick, CO (US)

(73) Assignee: Oracle America, Inc., Redwood City, CA (US)

( * ) Notice: Subject to any disclaimer, the term of this patent is extended or adjusted under 35 U.S.C. 154(b) by 308 days.

(21) Appl. No.: 12/607,583

(22) Filed: Oct. 28, 2009

(65) Prior Publication Data

US 2011/0099200 A1    Apr. 28, 2011

(51) Int. Cl.
G06F 17/30    (2006.01)
(52) U.S. Cl. ......... 707/698; 707/699; 707/828; 707/609
(58) Field of Classification Search .................. 707/699, 707/609, 698, 828
See application file for complete search history.

(56) References Cited

U.S. PATENT DOCUMENTS

| | | | | |
|---|---|---|---|---|
| 5,649,196 | A * | 7/1997 | Woodhill et al. | 711/148 |
| 6,553,372 | B1 * | 4/2003 | Brassell et al. | 1/1 |
| 7,529,770 | B2 * | 5/2009 | Dzeko et al. | 1/1 |
| 7,720,892 | B1 * | 5/2010 | Healey et al. | 707/831 |
| 7,788,220 | B1 * | 8/2010 | Auchmoody et al. | 707/609 |
| 7,870,161 | B2 * | 1/2011 | Wang | 707/801 |
| 2002/0049760 | A1 * | 4/2002 | Scott et al. | 707/10 |
| 2002/0138744 | A1 * | 9/2002 | Schleicher et al. | 713/187 |
| 2003/0187866 | A1 * | 10/2003 | Zelenka | 707/102 |
| 2003/0233455 | A1 * | 12/2003 | Leber et al. | 709/226 |
| 2005/0004993 | A1 * | 1/2005 | Miller et al. | 709/207 |
| 2005/0108242 | A1 * | 5/2005 | Kalker et al. | 707/10 |
| 2005/0203851 | A1 * | 9/2005 | King et al. | 705/51 |
| 2005/0222903 | A1 * | 10/2005 | Buchheit et al. | 705/14 |
| 2006/0031381 | A1 * | 2/2006 | Van Luijt et al. | 709/217 |
| 2006/0112431 | A1 * | 5/2006 | Finn et al. | 726/22 |
| 2007/0043967 | A1 * | 2/2007 | Stone-Kaplan et al. | 714/4 |
| 2007/0174915 | A1 * | 7/2007 | Gribble et al. | 726/24 |

(Continued)

OTHER PUBLICATIONS

Haitsma et al., "Robust Audio Hashing for Content Identification", International Workshop on Content-based Multimedia Indexing, Brescia, Sep. 2001, 8 pages.*
Wes Felter, Hack the Planet: Distributed File Sharing System Comparison, Aug. 10, 2000, 2 pages, accessed online at <http://wmf.editthispage.com/distributedFileSharing> on Oct. 24, 2011.*

(Continued)

*Primary Examiner* — Hung T Vy
*Assistant Examiner* — Phuong Thao Cao
(74) *Attorney, Agent, or Firm* — Marsh Fischmann & Breyfogle LLP; Kent A. Lembke; Jonathon A. Szumny

(57) ABSTRACT

A data sharing method using fingerprinted data objects for sharing data among untrusted network devices. Each peer device is adapted for storing a plurality of data objects, and a fingerprint generator is used to generate a fingerprint for each stored data object available for sharing or for recovery. The fingerprints are stored in a local data store, and a data manager running on one of the computer devices retrieves from another of the computer devices a copy of one of its data objects through the use of the associated fingerprints. The fingerprints include a hash value output from a strong hashing algorithm. The retrieving includes transmitting query messages with the fingerprints of the needed data objects to the networked, peer devices and then verifying the integrity of received data objects by generating a fingerprint of the received data objects that can be compared with the ones provided in the queries.

19 Claims, 8 Drawing Sheets

U.S. PATENT DOCUMENTS

| | | |
|---|---|---|
| 2008/0133706 A1* | 6/2008 | Chavez et al. ............... 709/218 |
| 2008/0195543 A1* | 8/2008 | Turner ........................... 705/50 |
| 2008/0201335 A1* | 8/2008 | Dubnicki et al. ............... 707/10 |
| 2008/0235163 A1* | 9/2008 | Balasubramanian et al. .. 706/12 |
| 2008/0243878 A1* | 10/2008 | de Spiegeleer et al. ....... 707/100 |
| 2009/0037393 A1* | 2/2009 | Fredricksen et al. ............. 707/3 |
| 2009/0158427 A1* | 6/2009 | Kim et al. ....................... 726/22 |
| 2009/0210697 A1* | 8/2009 | Chen et al. .................... 713/153 |
| 2009/0254609 A1* | 10/2009 | Wideman ....................... 709/203 |
| 2009/0282206 A1* | 11/2009 | Goldstein et al. ............. 711/166 |
| 2010/0306176 A1* | 12/2010 | Johnson et al. ............... 707/664 |

OTHER PUBLICATIONS

Liang et al., "Pollution in P2P File Sharing Systems", In IEEE Infocom, Miami, FL, USA, Mar. 2005, 12 pages.*

Schinzel et al., "Security Mechanisms of a Legal Peer-to-Peer File Sharing System", IADIS International Journal on Computer Science and Information Systems, 2009, vol. 4, No. 2, pp. 59-72, accessed online at <http://www.iadis.net/dl/final_uploads/2009110205.pdf> on Dec. 9, 2011.*

* cited by examiner

DATA SHARING AND RECOVERY WITHIN A NETWORK OF UNTRUSTED STORAGE DEVICES USING DATA OBJECT FINGERPRINTING

BACKGROUND OF THE INVENTION

1. Field of the Invention

The present invention relates, in general, to data storage and sharing and recovery of data among networked data storage and other computing devices, and, more particularly, to a method of data storage and recovery involving fingerprinting data objects to reduce the amount of integration required for storage devices to allow them to securely share data objects and also to make data recovery more efficient.

2. Relevant Background

The amount and type of data storage is rapidly expanding, and data management is rapidly becoming a significant cost for many businesses or enterprises. Particularly, enterprise data is growing exponentially and today's businesses need a way to dramatically reduce costs associated with data storage and management. Enterprises also have to provide proper data back up to meet their needs such as servicing clients and complying with regulations and laws regarding maintaining data for relatively long periods of time. A complication for most businesses is the enterprise data may be highly dispersed over many machines, data storage centers, and interconnected networks/systems.

Data deduplication may be used to lower overall costs of physical data storage by storing only a single instance of unique data (e.g., only one copy of particular data such as a file or data object is stored) for an enterprise or group sharing access to data. Deduplication is fast becoming a standard feature in many data storage systems, but existing data deduplication techniques have a number of limitations including the use of database, in-memory index, or similar mechanism to store the information that is needed to retrieve a specific instance of unique data. Data deduplication generally is used to refer to the elimination of redundant data. In the deduplication process, duplicate data is deleted to leave only one copy or instance of the data to be stored.

A number of issues remain for the data storage industry with regard to data distributed among a number networked storage and computer devices. For example, the sharing of data among devices typically may require close integration of the various devices such that the data transmitted from other devices may be trusted (e.g., the networked devices are trusted devices), and such close integration can lead to many complexities in the data storage devices and/or data management software.

A further complication with data storage is the challenge of providing effective and inexpensive recovery of data such as disaster recovery. For example, it may be important for an enterprise to provide processes, policies, and procedures related to, recovery or continuation of the enterprise's technology infrastructure after a natural or human-induced disaster that may cause loss of all or portions of their data. Conventional disaster recovery would then involve the enterprise requesting all their data from single source that is providing a back up service for that enterprise often using tape storage devices. Unfortunately, performing a full back up or data restore from tape is a slow process that involves streaming of all the backed up data, which does not allow the enterprise system to verify what data is being received or its integrity. Also, use of tape and other conventional disaster recovery does not allow random selection or access of files or portions of data, which may be useful when only portions or subsets of the enterprise's data has been lost in the disaster or other event causing data loss.

SUMMARY OF THE INVENTION

Briefly, data sharing methods and systems are provided that allow data to be readily shared, such as in a data recovery process, among untrusted devices. The method involves creating a distributed, global namespace for the shared data objects by providing a unique fingerprint or file name for each data object. Each participating device, for example, may run a fingerprint generation module to create fingerprints for its local data objects. When a data object is required by a device or machine, such as in the event of a disaster that causes loss of data, a device may query (with the fingerprint) its peers in the data share network or system to find an instance of the data object and then retrieve (again, with the fingerprint) the data object from a peer that provides an affirmative response to the prior query. Data integrity may be maintained by the receiving device or machine generating a new fingerprint for the received data object and comparing it to the fingerprint used in the polling and retrieval messages.

The method generally uses a fingerprint generation software application to create fingerprints for each received data object, and these fingerprints may include a location portion and a name portion. The location portion may be generated by use of a strong hash function (e.g., SHA-512 or the like) to create a hash of the data object, and, in some cases, this hash value may be segmented into an equally or differently sized segments or sub-strings to suit a devices namespace (but not typically as part of the fingerprinting process as the hash value, provides the fingerprint). When included, the name portion of the fingerprint may be generated using a function that processes the data object to produce a unique identifier such as a non-secure hash function, e.g., a standard cyclic redundancy check that provides a CRC for the data object, or, in other cases, all or a portion of the hash value provide the name component.

More particularly, a data sharing method is provided that uses fingerprinted data objects to facilitate efficient and secure sharing (such as to support disaster recovery) of data within the devices of a network. The method includes communicatively linking a set or number of computer devices or peers/participants via a digital data communications network. Each of these devices is adapted for storing a plurality of data objects (such as files, data blocks, or the like) such as in a data storage device or other memory. The method includes providing a fingerprint generation module on each of the computer devices for later execution or running with its microprocessor(s). Each of the peer computer devices then acts to process at least a portion of their local data objects with the fingerprint generation module so as to generate a fingerprint for each data object available for sharing (or recovery) within the system/network. The fingerprints are then stored in a local or accessible data store (e.g., in any manner that allows ready searching or look up of these fingerprints). A data manager running on one of the computer devices may then act to retrieve from another one of the computer devices a copy of one of its data objects through the use of the associated fingerprint.

In some cases, each of the fingerprints includes a hash value that is output from a hashing algorithm (such as a standard-compliant, strong hash function). In some cases, a second component of the fingerprint may be provided by the fingerprint generation module including a portion of the hash value or, in other cases, determining the cyclic redundancy check (CRC) value for the data object while in other cases the fingerprint does not include a second component or all or a portion of the hash value are used to provide the name component. The step of retrieving the data object may include transmitting to a list of the peers or broadcasting a query message that includes the fingerprint of the needed data object to all the computer devices over the network. Then, the data manager may transmit a directed or polling message with the fingerprint to retrieve the data object from one of the peer computer devices that responds affirmatively to the broadcast query. The retrieving step may also provide data integrity by including receiving the data object from the polled peer device, generating a new (or integrity check) fingerprint of the received data object with the fingerprint generation module, and verifying the two fingerprints (one sent out in the query and poll messages and for the received object) match or are identical (at least in predefined portions). Once integrity is verified, the data manager may store the data object in local data storage (or use it in another context such as provide it as input to a running application) such as may be the case in a rebuild of an instance repository or other data store during data recovery operations.

DETAILED DESCRIPTION OF THE PREFERRED EMBODIMENTS

Figure 1:
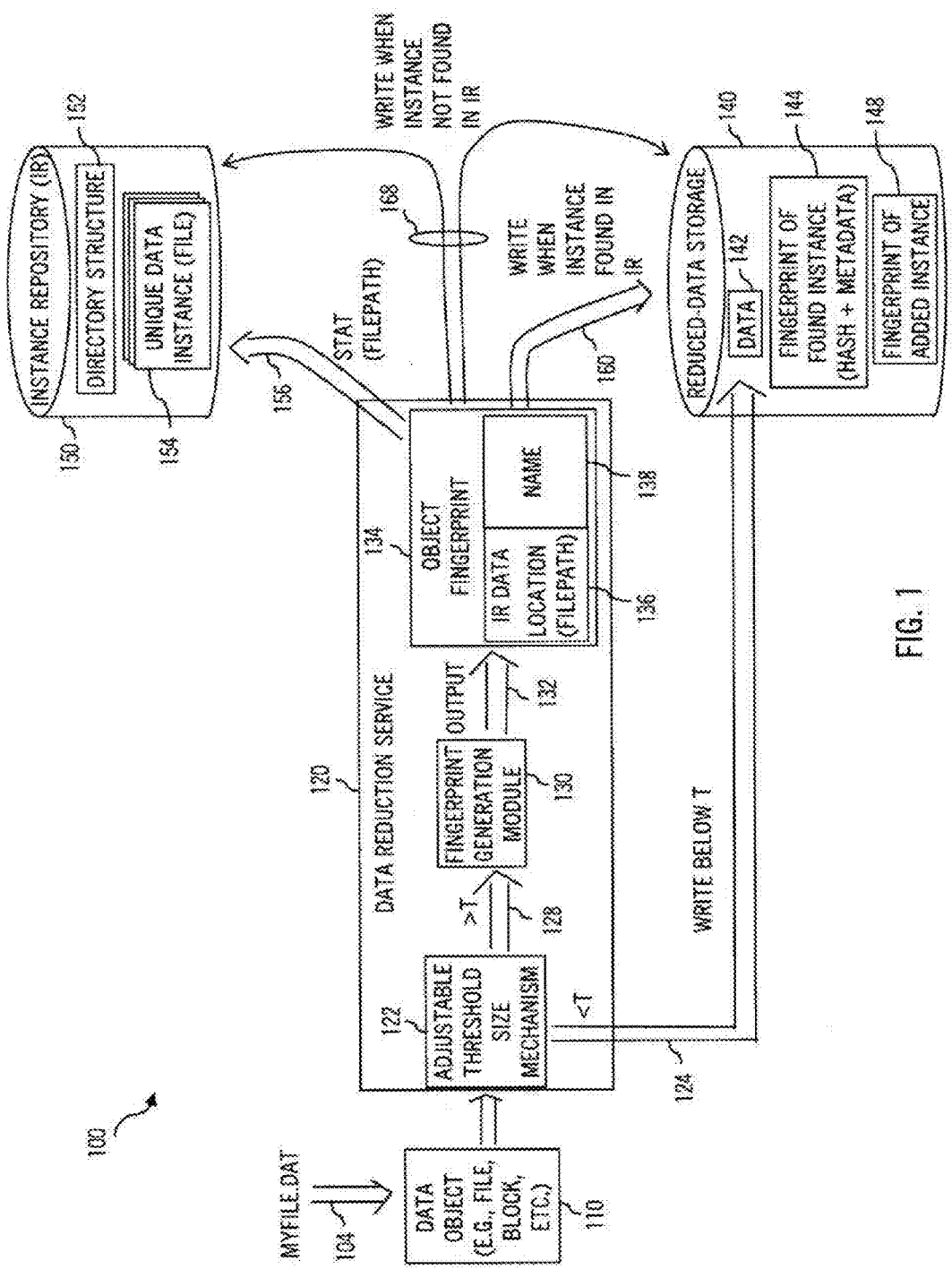
FIG. 1 illustrates process flow during data deduplication processes performed using a data object fingerprinting technique described herein to allow instances of unique data to be stored in a file system (e.g., via directory structure formed based upon a parsing of a hash value-based data object identifier or fingerprint to define nodes of a directory)

Briefly, the following description is directed to methods and systems for enhancing the sharing and recovery of data among networked data storage and computer devices. These methods and systems are facilitated or enabled by fingerprinting data objects within the network to allow the data objects to be queried and retrieved b devices in the network. In some embodiments, the data object fingerprints (or file name for a data object) may include a location segment or component (e.g., a hash value) and an optional name segment or component (e.g., a portion or all of the hash value, a cyclic redundancy check (CRC) code, or CRC for the data object). With this in mind and with reference to FIGS. 1 to 5, the following description begins with an explanation, the creation and use of such fingerprinting of data objects in a data deduplication application/context. The description then continues a description of systems and methods that utilize the fingerprints of the data objects to facilitate data sharing and data recovery.

Initially, it may be useful to explain that the following teaches a method for storage devices to request and validate datasets (e.g., sets of fingerprinted data objects) from other storage devices. This method requires significantly less understanding and coordination between the requesting and transmitting/sending devices as compared to other data storage systems that support data sharing and recovery.

Embodiments provide a method that creates a distributed global namespace to which any device on a network may contribute and also from which any device may issue requests for particular data objects (e.g., locate data objects based on their fingerprint/unique file name and retrieve located data along with verification using the fingerprint information). Embodiments also provide a method in which multiple systems may share datasets between one another without necessarily trusting one another. The data sharing may be done as part of load balancing, to provide redundancy, and/or as part of a disaster recovery process. One unique aspect of the described techniques is that the data devices do not need to be tightly integrated, and the data devices may be of differing types (e.g., ranging from primary storage devices to archive devices). One representative application of the described techniques/methods is within a virtual tape library (VTL) that exports access to its archived data. In such a setting or context, other computing or data devices in communication with or networked to the VTL do not have to understand VTL or its tape format but still can successfully request individual data objects from the VTL using fingerprints associated with the individual data objects.

Turning now to one method or technique for creating a unique fingerprints for data objects, it may be useful for explaining the creation of fingerprints in the context of data reduction (e.g., during data deduplication or the like). The following description is directed to methods of providing more efficient data reduction including providing data deduplication using a unique fingerprinting technique that is combined with an enhanced data storage technique based on this fingerprinting. Briefly, the data reduction techniques described below may include a method of storing instances of unique data in a conventional-type file system using a directory structure that is built from each data object's fingerprint. Significant to the described data sharing and recovery methods described later in this specification, a fingerprint generation module may be provided as a software application called or provided as part of a file manager (e.g., a module within a data reduction service or data deduplication module). The fingerprint generation module in turn may have a first portion that is used to generate a location segment or component of the fingerprint and a second portion that is used to generate a name segment or component, and these two components are combined to provide a file name for the data object. The location segment is used to provide a directory path for the named file (instance) with the directory structure taking the form of a conventional file system with a root directory having a plurality of subdirectories/nodes branching down to a consistent depth where the file providing the instance of the unique data.

In one embodiment, the first portion of the fingerprint generating module for creating the location component for the instance file includes a hashing function or algorithm (e.g., a strong hashing algorithm to limit collisions) that creates a hash value from a data object. This hash value may provide the fingerprint of the data object that is passed in data queries. To form a location component for a namespace, the hash value may be divided into a predefined number (that may vary per storage device) of sequential segments that may later be used to define subdirectories/nodes of a directory structure that can be used to define a location (e.g., define a directory path (or file path) in the instance repository or the like) for the unique data file or the instance.

Next or concurrently, when provided (e.g., in implementations where the fingerprint is not simply provided as the hash value) the name, component may be created in a number of ways with one exemplary embodiment providing a second portion of the fingerprint generating module that operates to determine a cyclic redundancy check (CRC) code or CRC for the data object (same object for which the hash value was generated), and the name component of the file name may be set to the CRC (or "CRC.instance" in some cases). Using these fingerprints for the data objects of an enterprise system or other computing system/network, an instance repository (IR) can be provided in which unique data or instances may be stored as conventional files with associated hash values defining the location of the file in the file system (or on the disk by defining which subdirectory will contain the file) and with a CRC providing a relatively unique name for the data. Also, these fingerprints provide a distributed global namespace for shared data objects within a data storage network or system, and numerous devices that are configured to generate and use such data object fingerprints may contribute/provide data objects and may request such objects from other devices (such as targeted or select objects lost by an enterprise).

To explain these concepts further, it may be useful to describe data flow during a data reduction process, but other processes may be used to create the fingerprinted data objects contributed to a distributed global namespace for shared data. A data reduction process 100 is shown in FIG. 1 that may be used to provide data deduplication, and the process 100 may be carried out or implemented using one or more computer devices (e.g., a computer such as a server using a processor(s) to execute code to provide the data reduction service 120) that are communicatively linked (wired or wireless linking via one or more network devices, for example, for digital data communications) with data storage (e.g., the repositories/storage 140, 150 may be conventional disk storage or other data storage devices). The process 100 is discussed below while files are being ingested by the data reduction service 120 to build an instance repository (IR) 150 and provide reduced-data storage 140 storing references to the single stored copy or instance 154 of unique data (which is stored in IR 150) without requiring a separate index file to allow later access of the data (e.g., to later retrieve data).

As shown, the ingest process of data reduction 100 may start with a data object 110 being received or accessed by a data reduction service 120. The data object 110 may take nearly any form to practice the invention such as unstructured data in the form of files or blocks of data (e.g., e-mails, images, documents, and the like) and/or such as structured data in the form of files or blocks of data (e.g., block level data such as mainframe data or the like). The data object 110 may be fed at 104 into the service 120 from a data source (e.g., as an object Myfile.dat file or the like), with the data source being nearly any computing or data storage device provided on a network or computer system. For example, the process 100 may be performed on an enterprise to reduce data (e.g., perform data deduplication) on desktops/workstations/other computers, servers, data storage, and so on (e.g., data reduction may be performed to reduce duplicate data in an e-mail server system or the like and each machine storing such data may provide at 104 input in the form of data objects 110 such as e-mails with attachments).

The data reduction service 120 may include a threshold size filter or mechanism 122 that acts to determine whether the size of the data object is greater than some threshold size value, T (e.g., 16 k-128 k). However, in most data sharing implementations, an data will be fingerprinted and no threshold test will be performed so as to allow all data to be identified, shared, and validated. In data deduplication settings, though, this may be useful because efficiencies associated with creating single instances 154 that are stored in an IR 150 and referenced by fingerprints/references 144 may not be achieved, in some cases, when the files/objects 110 are relatively small. To this end, the threshold mechanism 122 may compare the size of the data object 110 with the threshold value, T, which may be adjusted by a system administrator or a service 120 user, and when the threshold is exceeded (or at least met) the object may be passed as shown at 128 to a fingerprint generation module 130. If the threshold, T, is not exceeded, the data reduction service 120 may act to store or write as shown at 124 the data 142 in reduced-data storage 140. A client application or device may then retrieve the data 142 (e.g., with a call referring to Myfile.dat or the like) directly from the reduced-data storage 140.

The fingerprint generation module 130 processes the entire file or other data object 110 and generates an object fingerprint 134. The fingerprint 134 includes an IR data location component or value 136 (e.g., a file path to a file in the repository 150) and also a name field or component 138, and these two combine to provide a file name for instances stored as files 154 in the IR 150. As is explained below in detail, the location 136 is used to define where in a file system provided by or defined by the directory structure 152 an instance of the data object 110 should be found (if a copy is already stored at 154 in IR repository) or where it should be stored (if not yet present in the IR 150). The location 136 generally defines a file path in the directory structure 152 for the data object 110 while the name value 138 provides a unique (or relatively unique) identifier for the data object 110. In some embodiments, the location is a parsed or segmented version of a hash built for the data object 110 by the generation module 130 while the name 138 is the data object's CRC generated by the module 130.

In the data reduction 100, the data reduction service 120 acts at 156 to determine, based on the fingerprint 134, whether one of the unique data instances/files 154 matches the data object 110. As discussed above, the directory structure 152 of the IR 150 may be a conventional directory with a root directory/node and a plurality of subdirectories or nodes branching to a consistent depth (with the depth of the structure 152 depending upon the number of segments or partitions that the fingerprint generation module 130 uses to divide the hash value, for example, to create the location value 136). In such an IR 150, the instances are stored as files 154 at locations defined by the location 136 for the corresponding data object. Hence, a POSIX stat(filepath) or similar file status/query command issued to the IR 150 will determine whether a file 154 is present at a location in the directory structure 152 corresponding to or matching the location value 136 of the object fingerprint 134.

When such a file 154 is present, the process 100 at 160 includes writing the fingerprint 134 of the object 110 in the reduced-data storage 140 as shown at 144. Further, as shown, the information stored may also include metadata useful in building or providing the file 154 to a requesting application/client. As discussed in more detail below, the fingerprint 144 with its location component (e.g., a hash value for the data object 110 that has been segmented to define subdirectories in the IR 150) provides a reference or pointer to the location of the instance or file 154 corresponding to the fingerprint/metadata entry 144 in the reduced-data storage 140. When the status or file lookup at 156 does not find a matching file or instance 154, the data reduction service 120 functions at 168 to update the IR 150 and its directory structure 152 to include the data object as an instance or file with the name 138 at the location 136 defined by the fingerprint 134. Also, the service may store a fingerprint/metadata entry 148 for the added instance in the reduced-data storage 140 to provide a reference to this instance 154.

Figure 2A:
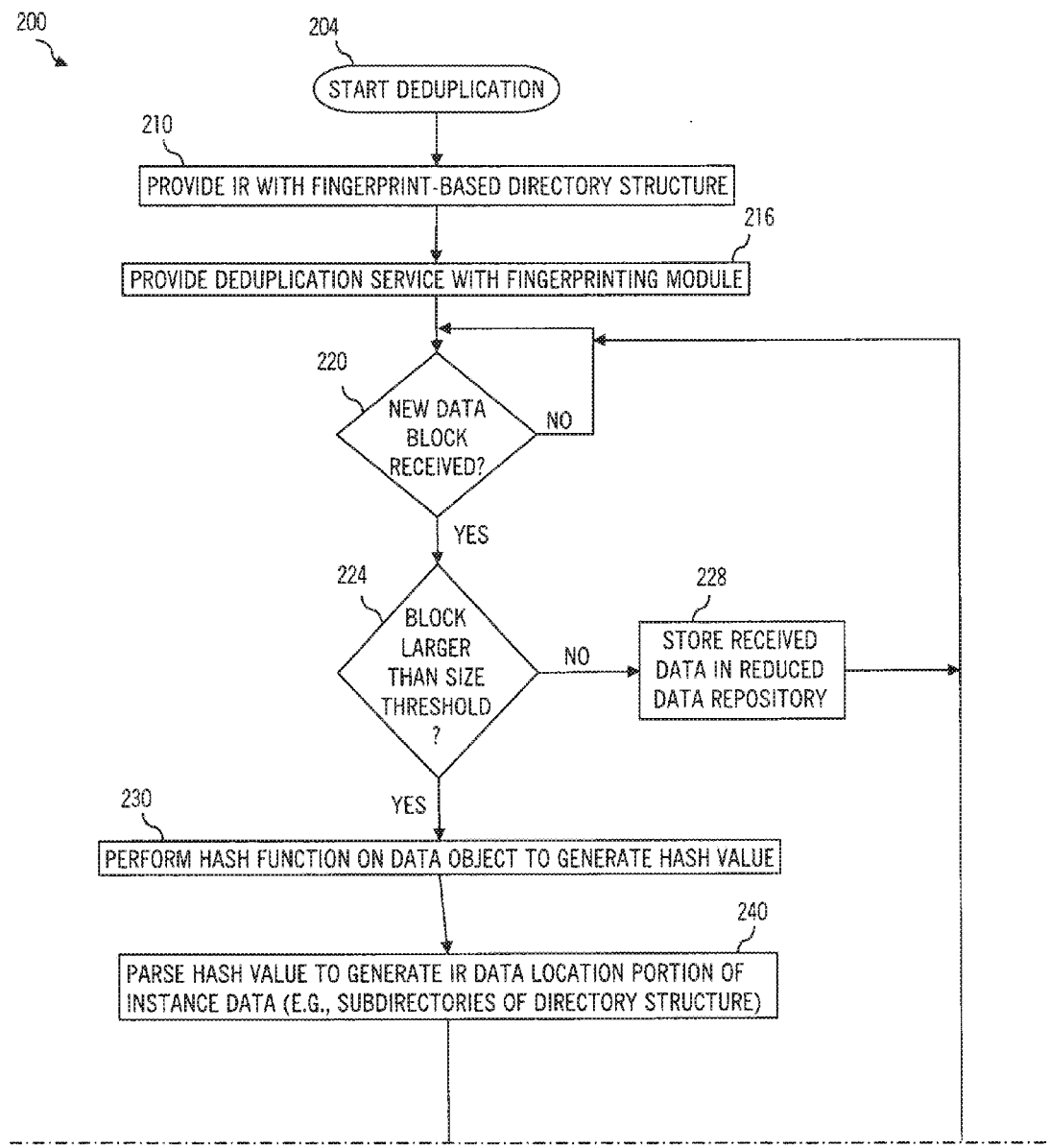
FIG. 2 is a flow diagram of a data reduction process according to an embodiment that includes fingerprinting and instance storage methods described herein as may be carried out by a data storage system including microprocessors executing code including code defining a data deduplication service with a fingerprint generating module.
Figure 2B:
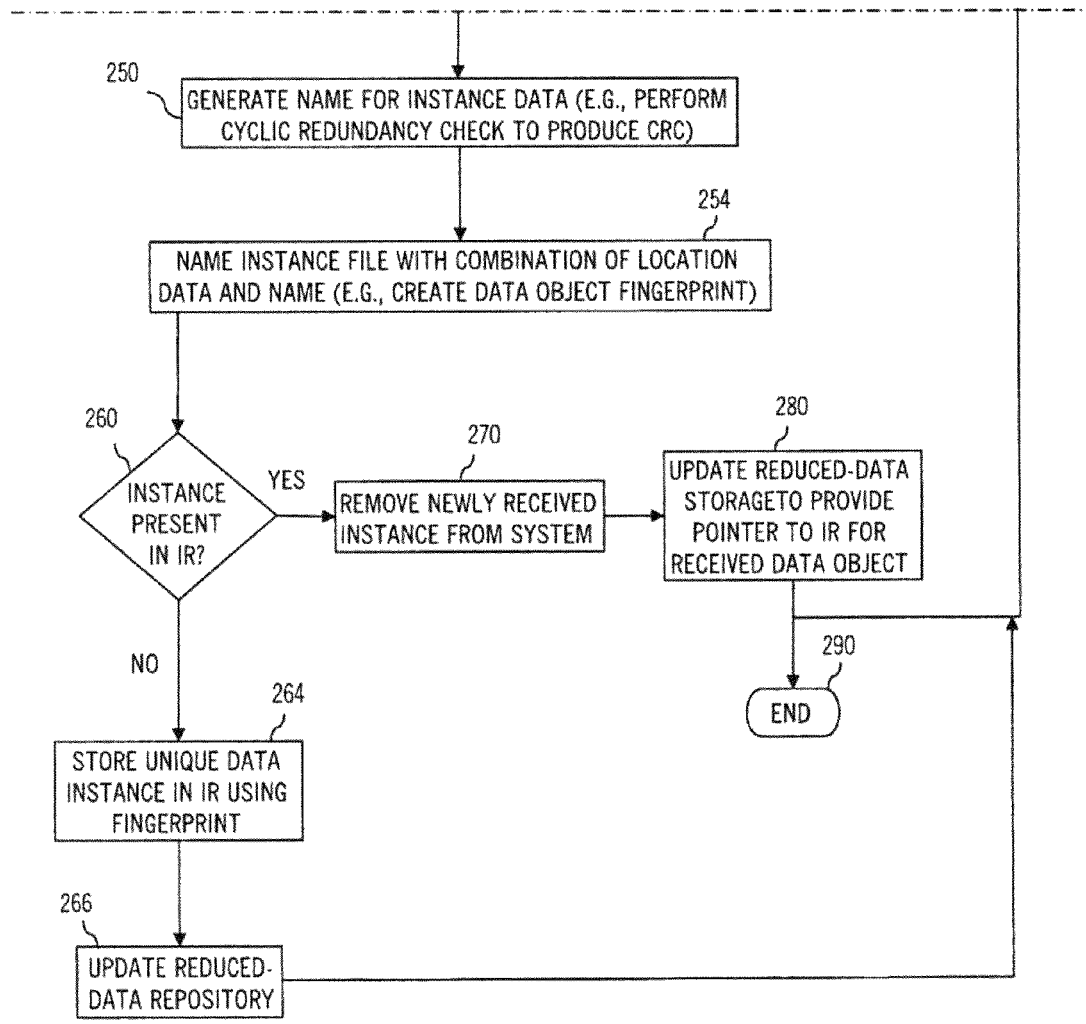

FIG. 2 illustrates a data deduplication method 200 that may be adapted to use standard file system constructs for storing instances and for quick verification of the existence of copies of ingested data objects. The method 200 starts at 204 such as with a selection of a technique for defining a location for a file storing a copy of an instance or a set of unique data. Step 204 may also include choosing a technique for providing a name component of each instance file. For example, 204 may include defining which hashing algorithm or function will be utilized in a fingerprint generation module and how output hashes for each ingested data object will be segmented/parsed to define subdirectories of the data structure in an instance repository (IR). Step 204 may also include selecting a naming component such as a CRC module that generates a CRC or CRC code for the ingested objects to define the name component/value (with some modification such as "CRC.instance" or the like) that can be combined with the segmented/partitioned hash to provide a file name that defines a file path for a particular file for each ingested instance. A CRC module may include a non-secure hash function to provide the CRC code (or just CRC) for a data object such as a standardized cyclic redundancy check function (e.g., CRC-16, CRC-32, CRC-64-ISO, or the like).

Figure 4:
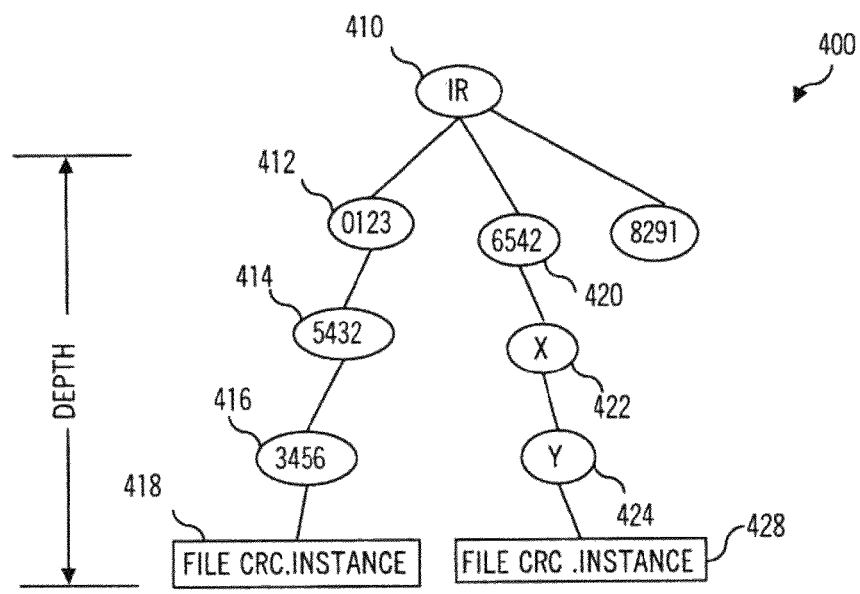
FIG. 4 illustrates a simplified example of an instance repository data structure that may be produced and stored in an instance repository (which may be provided on one machine such as a disk storage device or over two or more data storage devices, in one or more file systems, on one or more networked devices, or the like) during data reduction or deduplication methods described herein.

The method 200 may continue at 210 with providing an IR with a fingerprint-based directory structure in one or more data storage devices (that may be on one or more machines and one or more systems/networks). Typically, the IR directory structure takes the form of a conventional file system with a root directory and subdirectories/nodes, and the instances/files may be provided at the lowest layer or same depth of this directory structure (e.g., due to using a single hashing function and a like number of subdirectory segmentations/divisions of the hash, the depth of the structure is consistent for each file). An exemplary structure that may be built or provided in method 200 is shown in FIG. 4. The IR will be provided in the computer system or network upon which the method 200 is performed such that it is accessible by the data reduction service/deduplication module for checking for unique data files/instances and also for adding received data objects at locations defined by the fingerprinting process when such data objects are not yet present in the IR.

At step 216, a deduplication service is loaded or otherwise provided upon a computer system such as a server as a software application/suite, and the service includes a fingerprinting module (or can call such a standalone module providing this functionality). As discussed above with reference to step 204, the fingerprinting module typically will include a hashing portion that is adapted for applying a hashing algorithm on a data object (e.g., an ingested file or block of data) to provide a hash value that may be parsed or divided into a set of segments that include values that are used to define unique subdirectories in the IR directory structure. Also, the fingerprinting module includes code executable to define a CRC for the data object for use in naming the file for the data object. Further, the data deduplication service may include a comparison mechanism that is useful for accessing the IR to determine whether a file already is present in the IR that matches the received instance (e.g., with a single look up rather than a two-part or two step process as was more typical of prior deduplication services).

At 220, the method 200 continues (such as part of an overall data reduction process in a computer system, for example) with waiting for a new data object to be received during the ingest process. When a data object is received, the method 200 continues at 224 with a determination of whether the size of the data object exceeds a threshold minimum size (e.g., a size of a data object for which fingerprinting and storage of a single, referenced instance, is more efficient use of data storage than keeping separate copies of the data such as in a reduced-data storage). Note, again, though, that in data sharing applications this step would not be performed as it is desirable to fingerprint all data objects to identify, share, and validate the data. However, in deduplication settings, when the received data object is smaller than (or does not exceed) the threshold size, step 228 may be performed to store the received data object in a reduced-data store (or taking no further step such as by retaining a file at the source device/machine).

When the threshold is exceeded at 224, the method 200 may continue at 230 with performing a hashing function of the fingerprint generation module on the data object (e.g., hashing an entire file or block of data) to produce a hash value. At 240, the hash value is parsed to generate an IR data location portion of the instance data (sometimes called file name herein). In some cases, a strong hashing algorithm is applied (such as one of the Secure Hash Algorithms designed by the National Security Agency such one from the SHA-0, SHA-1, or SHA-2 families, e.g., SHA-256, SHA-512, or the like) to provide a string (e.g., an American Standard Code for Information Interchange (ASCII) string of a particular size depending upon the hashing algorithm) that is then parsed or divided into a predefined or selected number of segments/portions, with each segment of the hash defining a subdirectory or node of a data structure tree in the IR. For example, step 240 may call for the hash value or string to be divided into 3, 4, or more segments to define a like number of subdirectories, which define a file path in the IR where the file/instance is stored (or where a copy of the data has already been stored).

At 250, the method 200 includes generating a name for the received data object, and this may include determining a CRC for the data object. Then, the instance data may include a name including the CRC (e.g., "CRC.instance" or the like). At 254, the instance or data object file is named or labeled with a combination of the location data (e.g., segmented/parsed hash value) and name (e.g., CRC code for the data object for which hashing was performed). Steps 230-254 provide a fingerprint for the data object.

The method 200 may continue at 260 with accessing the IR with the fingerprint to determine whether a file matching the received and fingerprinted data object is already stored or present in the IR. This may be completed in some cases with a standard file system status check (e.g., a stat(filepath) command or the like with "filepath" defined by the segmented hash value that is used to define the location of each data object in method 200). If the data is not unique (i.e., a file is located in the IR at a location defined by the fingerprint), the method 200 continues at 270 with removing the newly received instance from the system/device(s) undergoing data reduction (e.g., from a client machine or an e-mail server or the like). At 280, the reduced-data storage is updated such as to provide a pointer to the file in the IR that is associated with the data object received at 220 by the deduplication service (e.g., storing the hash value along with any other metadata useful in building the file/data object from the copy/instance in the IR). The method 200 may end at 290 or continue at 220 with receiving additional data objects.

When the deduplication service determines at 260 that the received data object is unique (i.e., no file at the location in the IR data structure), the method 200 continues at 264 with storing the unique data instance in the IR using the fingerprint to define the location (or file path) for the file (e.g., "CRC.instance"). At 266, the method 200 may also include updating the reduced-data repository or storage such as to include a pointer to the instance for the client device/application that provided the data object added to the IR. For example, the pointer may be the segmented/partitioned hash value or location data from the fingerprint (or may simply be the fingerprint) and metadata useful for building the file or other data object from the stored instance may also be written to the reduced-data store in step 266. The method 200 may again end at 290 or continue at 220 with receiving addition data with the deduplication service.

It may be useful at this point to provide one exemplary implementation of the use of an IR with a directory structure corresponding to location information in fingerprints of data objects. As will be appreciated from this description, embodiments of deduplication services configured as suggested utilize a unique method of storing instances of unique, deduplicated data objects. The method may be used on any standard file system/operating system (OS) combination. The method eliminates the need for indirect methods (e.g., database methods requiring two-step IR access) for locating unique objects. The method also increases the performance of locating metadata and data within a deduplicated dataset.

In embodiments of the method, identification of unique data objects may be accomplished by scanning the received data (data provided, for example, during ingest). During scanning, a SHA-512 (or other strong hash algorithm) hash signature is created, and in parallel or sequentially, a standard CRC-32 value is created from the scanned data. When unique files or data blocks are identified in the method, they are stored in an IR. Rather than storing the instance data (e.g., a fingerprint including a parsed hash signature and a CRC code) in a database or index and incurring the overhead associated with a database/index, unique file instances are stored in regular files in the IR.

The directory structure of the IR may be based on the fingerprint values (or location portion formed from the hash value or hash signature) created by the data reduction operation. For example, the data object may be processed by a location component of the fingerprint generation module to produce a hash signature or value. In one embodiment, for example, the hashing function used is a SHA-512 hash, and the result of hashing a data object is a 512-bit binary value that is translated into a 128-byte ASCII string. The fingerprinting generation module may then function to parse this string into sub-strings or segments. For example, one embodiment of the fingerprint generation module parses the hash signature string into 16 sub-strings that are each 32-bit chunks of the 512 total bits, with the number of sub-strings defining the number of sub-directories of the IR directory structure and each substring being used to create a subdirectory of the IR. In another embodiment, 8 sub-strings are provided that are each 64-bit chunks of the 512 total bits while another embodiment may call for 4 to 32 sub-directories to be used with the specific depth of the directory structure not being limiting to the invention. In the 16-substring example, for each unique instance of data, the file that represents that instance is stored in the IR in a directory that is 16 levels deep comprised of the ASCII sub-strings discussed above. The name of the file for the instance may be "<CRC value>.instance" for example.

Figure 3:
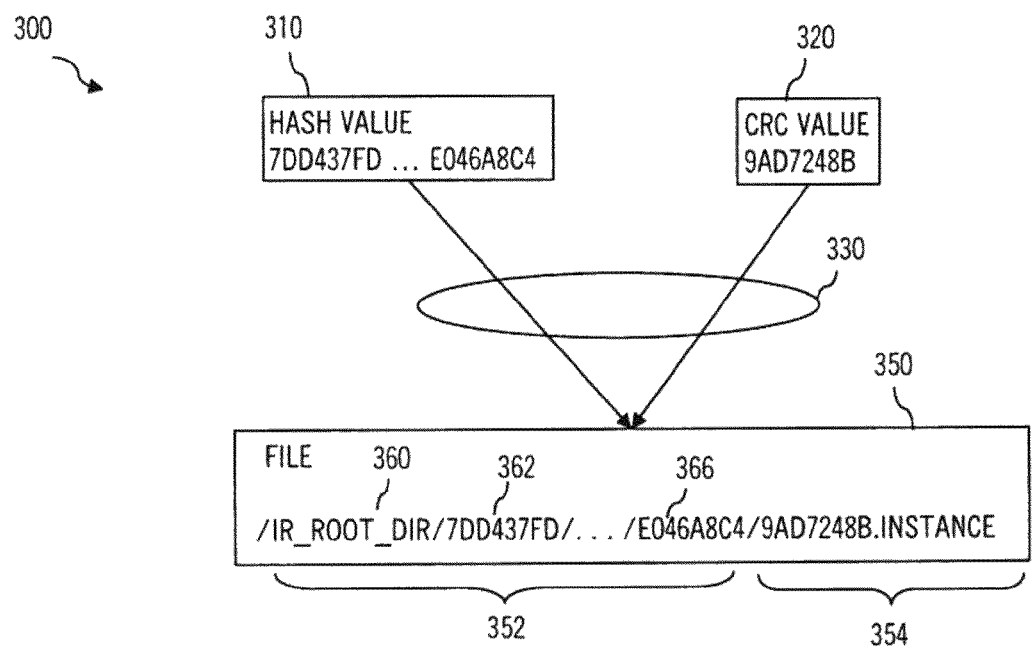
FIG. 3 is a block diagram showing the fingerprint generation process that may be implemented in embodiments described herein.

FIG. 3 illustrates an exemplary fingerprint generating process 300 for a received data object (not shown). For example, the fingerprint generating mechanism may use a location generation module (with a SHA-512 hashing algorithm or the like) to process the data object and provide a hash value or signature 310 (shown as 7DD437FD . . . E046A8C4 as an example). The fingerprint generating mechanism may use a CRC or other naming module to process the same data object to provide a unique identifier 320 (shown as an exemplary output of a CRC-32 algorithm as 9AD7248B but another unique identifier-producing algorithm may be used, with the chosen name-generating process typically requiring significantly less processing the hashing algorithm but in most cases providing a unique value). At 330, the fingerprinting generation module may act to parse/divide the hash value into segments or sub-strings and combine this parsed location data with the unique name/identifier value 320 to provide instance data.

As shown, the resulting instance would be stored in the file 350 shown as "/IR_Root_Dir/7DD437FD/ . . . /E046A8C4/9AD7248B.instance" in this example as built from hash value 310 and CRC value 320. The instance data 350 includes, a location component or portion 352 (which may also be thought of as the file path in the IR directory). The location component of the instance data 350 is configured in conventional file system form with a root directory identifier 360 (e.g., the IR root node) and each sub-directory 362, 366 as defined by the sub-strings obtained from the hash value 310 at 330. The instance data 350 also includes an identifier or naming component 354 that includes the CRC value 320 combined with ".instance" in this example.

It should be noted, though, that it is not necessary to fingerprint a data object with the use of a CRC. Also, the last portion of the hash value may be used in a directory and name structure as the CRC is being used above. One value of using both the hash and the CRC in a fingerprint is for detecting/addressing hash collisions and not mainly for use in providing a file name or fingerprint for the data object. Hence, embodiments of the invention may utilize just a hash value as the fingerprint for a data object or they may use a hash value plus an additional naming component that may be provided by a portion or all of the hash value.

Using this format for creating a fingerprint of a data object and then using this fingerprint to build an IR with a conventional file system construct/directory structure and determining if ingested data is unique or duplicate provides a number of advantages. This formatting of fingerprints and providing locations of files in an IR has the advantage of not requiring a database or memory index be accessed to determine whether or not a given instance already exists in the system. Instead, the data reduction service may simply invoke a system call such as a POSIX stat( ) call or the like to determine, once a fingerprint is generated (with the location data used in the system call), whether the file already exists in the IR. If so, the newly received instance may be removed and a reference count to the particular instance may be incremented. Storing the instances in the IR in this manner (based on the fingerprint generated for each data object) also provides the advantage in use of being able to use normal system utilities such as commands ls, cp, chmod, and/or the like to view and/or manipulate the instance repository contents. Note, though, these system utilities (as well as some underlying libraries) may fail in some file system/operating system combinations when too many files reside in a single directory.

FIG. 4 illustrates a simplified directory structure 400 that may be provided using the methods described herein to build an IR including fingerprinting ingested data objects during data reduction. The structure includes a root directory or node 410 identifying the files or instances being in the file system(s) associated with the instance repository. The directory structure 400 may have a depth, that is consistent for each file/instance 418, 428 as it is defined, at least in part, by the number of partitions or segments into which a location value (e.g., a hash value or signature) is divided up into during the fingerprint generation process. For example, the depth may be about 16 in the example provided above in which the 512-bit binary ASCII string is divided or parsed into 16 sub-strings of 32 bits each.

In the simplified example, the depth of directory structure 400 is much smaller as the location value (or hash value) is broken only into three equal sub-strings, and each of these sub-strings is used to define a sub-directory as shown specifically at 412, 414, 416 to define a location in the directory 400 for a file 418 (with a name of "CRC.instance", with the CRC being determined for the particular data object associated with file/instance 418). Other unique data objects would be processed to produce differing fingerprints with different hash values and CRCs, and these each would be used to build different sub-directories and provide a different location for a file 428 as shown with sub-directories 420, 422, 424 defined by sub-strings of the hash value associated with the file 428 (also being named based on its CRC as was the case of file 418).

In some cases, the sub-strings may be of equal size while in other cases different devices may divide a hash value at different points to implement their own particular namespace implementation. In this description during data sharing and recovery operations, it is the fingerprint (which does not need to include the divisions or a CRC value) that is transmitted in the queries. Each device can break up that fingerprint into sizes matching its namespace. For example for optimal performance, a relatively small device (e.g., anticipating a total of thousands of objects) may divide the hash into two segments (e.g., first 4 bytes and all remaining bytes). This means the small device has less directories to navigate, which lets it do it more quickly. A very large device, in contrast, that may be anticipating billions of objects, may divide the hash into more or multiple segments (e.g., first byte, second byte, third and fourth byte, fifth to tenth bytes, and all remaining bytes or some other segmentation). This will ensure each of the directories do not have millions or billions of objects in them because navigating a single directory with millions of objects is slower than navigating several directories with less objects in each of them. Further reasons for using differing sized segments may be found by assuming the hash gives good randomness and the resulting byte array is turned into a hex string. Then, using only 2 or 3 of the first characters will give 256 or 4096 first level directories with a good distribution of the objects spread across them. In contrast, the 'equal-sized' approach may give 10s of thousands of first level directories with only small handful of files in each. Hence, it may be useful to provide 4 or 5 levels of directories (in some cases) that each use 2 or 3 characters from the hash string so as to give a good balance of the number of directories to files per directory. Then, the remaining characters from the hash may be used as part of the file name.

The IR associated with structure 400 may be stored or provided in a single file system that is stored in a single or multiple data storage devices (e.g., a single or multiple disk drive devices). In other cases, though, the IR structure 400 may be carved or divided up in any useful manner such as based on sub-directory values, and then each of these portions of the IR may be stored in different file systems on one or more machines and/or networks/systems, which may utilize the same or differing OS, data management software/applications, and the like.

Figure 5:
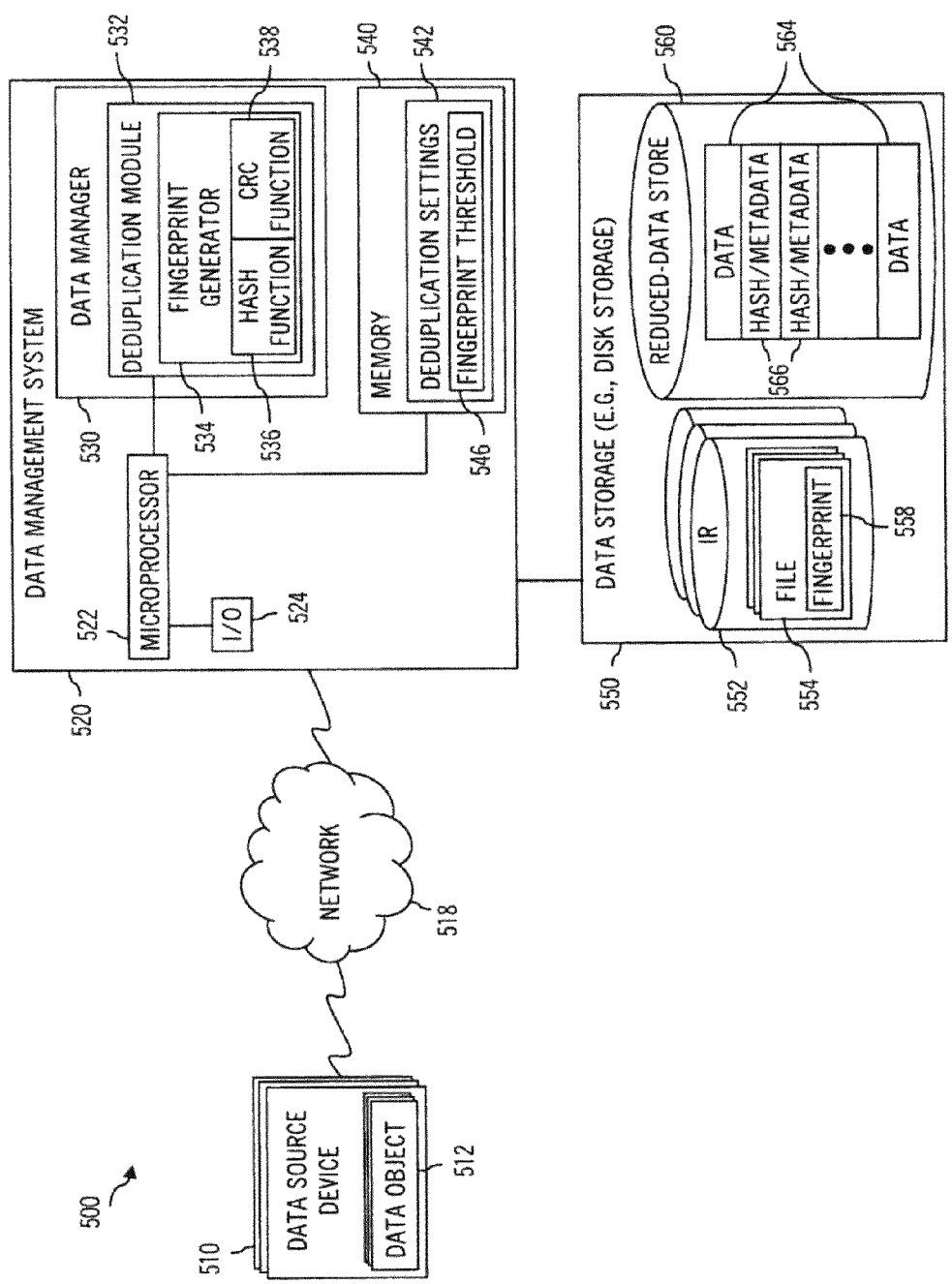
FIG. 5 illustrates a functional block diagram of a computer system that may be used to implement data reduction including fingerprint-based data deduplication (e.g., by implementing the method of FIG. 2 or the like)

FIG. 5 illustrates a computer system or network 500 in which the methods described above (e.g., with reference to FIGS. 1-4) may be implemented to provide enhanced data reduction capabilities and to facilitate data sharing and recovery by creating IRs and reduced-data storages that may be accessed using fingerprints of data objects. The system 500 includes a plurality of data source devices 510 (such as client machines, servers, data storage devices, and the like) that each include one or more data objects that may be fed to a data management system 510 via a digital data communications network 518 (e.g., the Internet, an intranet, a local area network (LAN), a wide area network (WAN), or the like with wired and/or wireless connections). The data management system 520 may be provided with one or more computing or electronic devices such as a conventional server or the like and includes a microprocessor(s) 522 that controls and manages input/output devices 524, such keyboards, monitors, touchscreens, a mouse, and the like that may be used by an operator or system administrator to initiate a data reduction process and/or to set deduplication settings 542 stored in memory 540 such as fingerprint size thresholds 546 (e.g., defining how large a data object 512 has to be prior to applying the fingerprinting processes but again this information may not be stored in applications where all data is fingerprinted to support sharing and recovery of all data).

The microprocessor 522 also executes code to provide one or more software applications to provide the data management functions described herein such as data reduction that involve deduplication and then later retrieval of data from an IR 552 and/or reduced-data store 560. To this end, the data management system 520 is shown to include or to be running a data manager 530 that includes a deduplication module 532. The module 532 may be used to perform the methods 100 and 200 of FIGS. 1 and 2 as well as to create fingerprints and data structures as shown in FIGS. 3 and 4. The module 532 may include a fingerprint generator 534 that acts to scan a received data object 512 and create a fingerprint (shown at 558 with file 554 in IR 552).

This may include using a hash function 536 (e.g., a SHA-512 function or the like) to produce a hash for the data object 512, using a CRC function/mechanism to generate a CRC code for the object 512, parsing the hash into sub-strings that define sub-directories of the IR 552 in a data storage 550 (e.g., disk storage device(s)) linked to the system 520, and combining the segmented hash or location component with the name component provided at least in part by the CRC code. The parsing step may be considered laying the key down as an index to a file system provided by/in the IR and/or as defining a file path to the file/instance in the IR.

During a data reduction process, the data manager 530 may process a received data object 512 using the deduplication module 532 to define a fingerprint 558 for the data object 512.

The data manager 530 may then access the IR 552 with the location data provided by the fingerprint (e.g., the segmented hash value from the hash function 536 and generator 534) to determine whether one of the files 554 matches the data object 512 (e.g., the received data object is a duplicate), which may involve querying the IR 552 with the location data to determine if there is a file 554 at the location defined by the fingerprint provided by generator 534. If the data object 512 is smaller than the threshold value 546 in the IR, the data manager 530 may, such as via operation of deduplication module 532, write the data 512 to the reduced-data store 560 as shown at 564 as part of this reduced-data dataset in store 560. If the data object 512 is not present in the IR 552, the data manager 530 may act to store a file 554 using the fingerprint (or instance data) 558 in the IR 552 (e.g., at the location defined by the segmented hash value). If the data object 512 is present in the IR 552, the data object 512 is a duplicate and the data manager 530 may act to store as shown at 566 only the hash value for the data object and metadata in the reduced-data store. The data object 512 may be removed from the system 500, and the entry 566 provides a pointer or reference for the data source 510 to later access/retrieve the file 554 associated with the data object.

The computer or data storage system/network 500 of FIG. 5 (or other networks of computing/data storage devices) may be used to implement a number of processes with the fingerprinted data objects. For example, FIG. 6 illustrates a method 600 for establishing a data storage system providing storage of data in a distributed manner over two or more devices using a distributed global namespace for locally stored data objects, and FIG. 7 illustrates a method 700 for sharing data objects among the devices participating in the data storage system established per the method 600.

Figure 6:
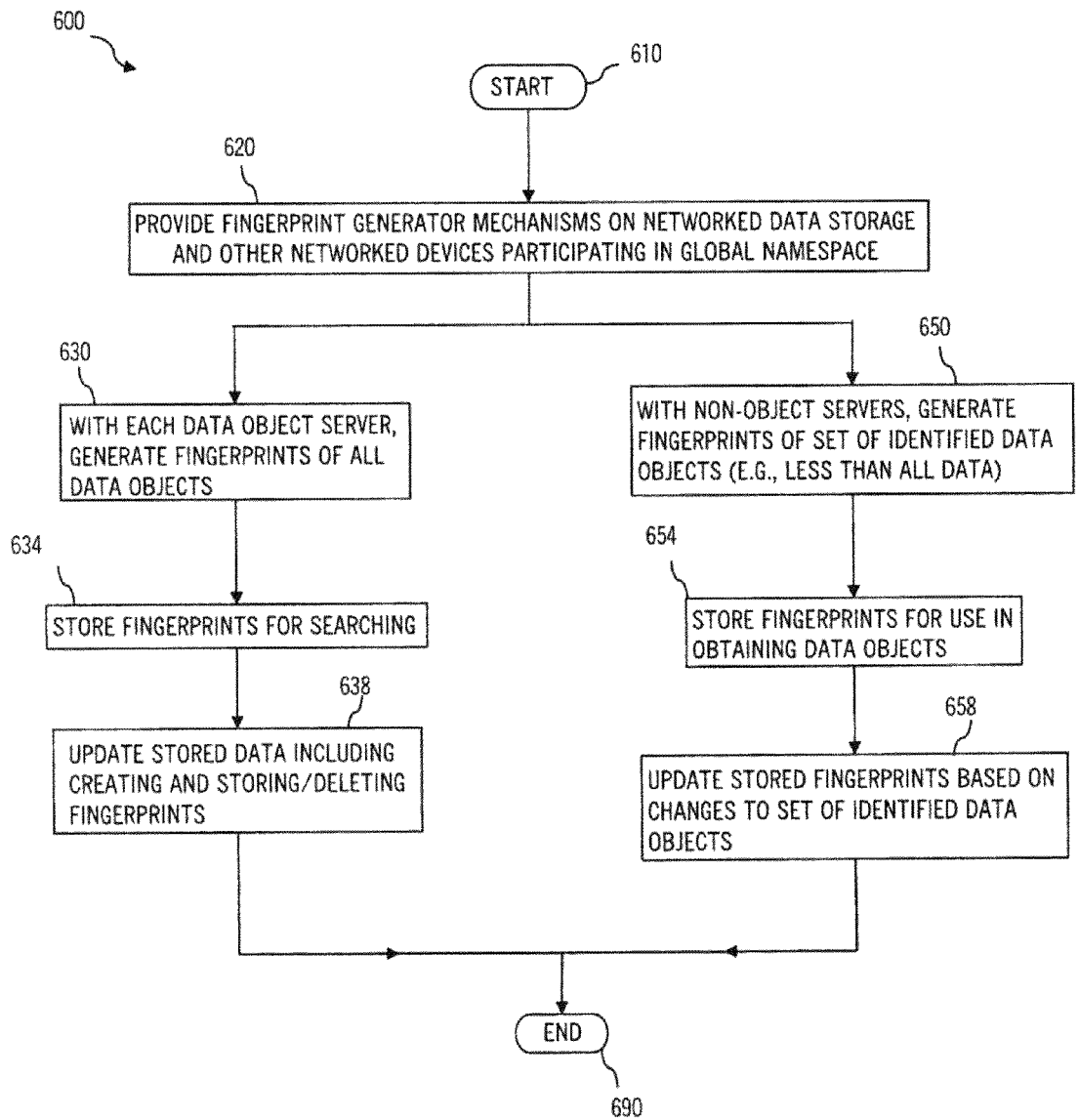
FIG. 6 is a flow diagram showing one embodiment of a method for creating a data storage system or network providing improved sharing of data objects to support recover, load balancing, and other functions among untrusted devices.
Figure 7:
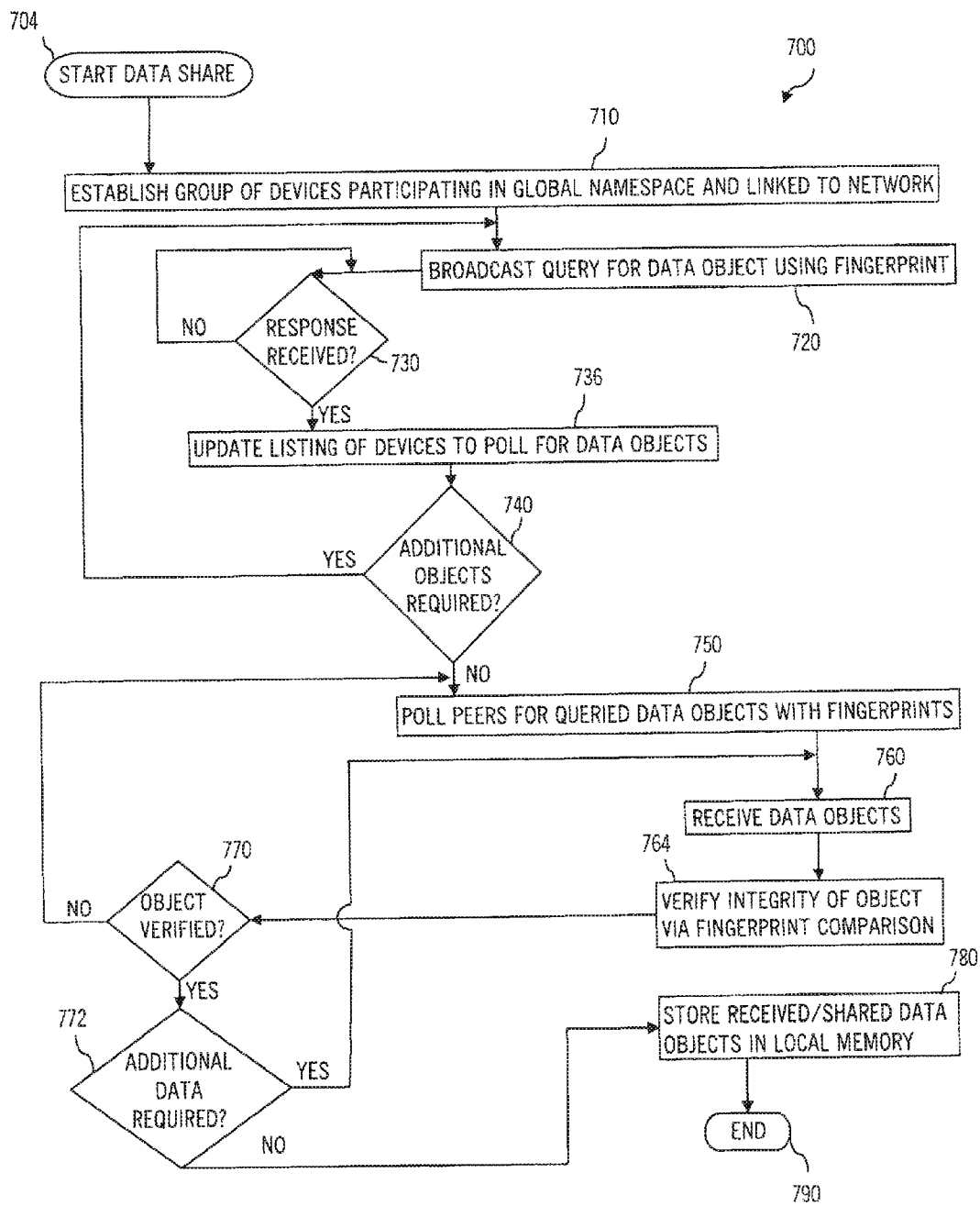
FIG. 7 is a flow diagram showing one exemplary data sharing process that may be implemented using the data storage system formed using the method of FIG. 6.

With reference to FIG. 6, the method 600 starts at 610 such as by defining a fingerprinting technique to be used to provide the namespace for data objects in a data storage system, and step 610 may also include defining communication protocols for the various participating devices to communicate data object queries and data object requests/polling to find and retrieve fingerprinted data objects. Any of the fingerprinting techniques described above with reference to FIGS. 1-5 may be utilized to provide a file name or fingerprint for each data object that is to be shared or served within a data storage system/network. The method 600 continues at 620 with providing a fingerprint generator mechanism on each of the networked data storage and other networked devices participating in the system (e.g., participating in a global name space for sharing data objects). For example, the fingerprint generator 534 shown in FIG. 5 may be provided on each participating device/system (or be accessible/callable by such devices/systems) so as to be useful for creating fingerprints that may include a location component (e.g., a segmented hash value) and a name component (e.g., a CRC for the data object which has been operated upon by the hash algorithm/function).

According to some aspects of the invention, a namespace is created and utilized for deduplicated data objects based on their hash value rather than on any directory, proprietary/system-specific file name, or other metadata the user supplies. This produces a globally resolvable, platform-independent namespace. In some systems and networks of participating devices, the devices may be grouped into two groups: data object servers (e.g., data storage devices/systems) and non-server devices (e.g., devices running applications using and generating data that may need to be backed up or recovered such as an enterprise computer system running enterprise software that creates, or utilizes data or data objects).

Devices participating in the global namespace (e.g., the system/network sharing data objects) may each have a subset of the data held by the entire or overall group of devices. Each device may independently add and remove objects locally and update their local namespace accordingly. Since the namespace is generated from the content of each data object (rather than based on arbitrary file names or the like), no coordination between machines/devices is required to maintain, namespace integrity during these add and remove processes. This is because given the same data objects, each of the participating device uses an identical or similarly operating fingerprint generator mechanism to process data objects to generate the same fingerprints or file names to create a similar namespace to reference the shared (or network-accessible) data objects.

Referring to FIG. 6, parallel paths that may occur sequentially or concurrently for data object server devices and for non-object server devices. At 630, with each data object server, the fingerprint generator mechanism(s) is operated to generate fingerprints of all data objects served by the particular data object server device/system (e.g., a concatenation of a location component and a name component that at least includes a namespace provided by a segmented hash for the data object as described above). Each machine functioning as an object server typically keeps/stores the hash values or fingerprints of its local objects in a form it can easily search. For example, step 634 may involve a data manager module operating to store fingerprints of all data available to the system/network in its data storage devices, in its IR, or the like in a local memory device or data store for later searching (e.g., in searchable list, database, or the like).

Based on these globally-used fingerprints, each data object server device is ready to receive queries or requests for the data objects regardless of what type of device the particular server device happens to take (e.g., a primary data storage or creation device, an archive device, or other device storing data locally and acting to serve this data to other networked devices) and/or regardless of what type of device requests the data (e.g., an application running on an enterprise system/device, a data source device 510 as shown in FIG. 5, a client node linked to a communication network, a primary or archive storage device/system, or the like). At 638, the method 600 may involve one or more of the data object server devices operating independently to update stored data (or data objects), and, as part of such updating/creation of data, also updating the local namespace of its data (e.g., creating and storing fingerprints for new/modified data objects or deleting fingerprints of data objects that are deleted or removed from its local memory or data storage such as removal of an instance from its IR). The method may end at 690 or repeat (not shown) step 638 with further updates.

At 650, non-object server devices also act to generate fingerprints of data objects. However, since these machines are not functioning as object servers, these devices typically will not assemble the entire hash namespace for their local object, but, instead, these devices typically will only generate fingerprints for a set of identified data objects. For example, if these devices or their running applications/client devices may require or desire an alternate source for a subset of their data objects (e.g., for disaster recovery, load balancing, or other purposes), the non-object server device may use its data manager and fingerprint generator mechanism to compute fingerprints of this subset of their overall data objects. At 654, the fingerprints are stored in a data store or other memory for use in later obtaining these data objects such as via a request (using the fingerprint(s)) from one of the data-object server (or non-server, in some cases) devices participating in the data sharing network/system. At 658, one or more of the non-server devices may update the stored fingerprints in response to changes to one or more of the set of data objects earlier identified in step 650 such as data for which backups are required for disaster recovery procedures. Step 658 may be repeated (not shown) in the method 600 or the method 600 may end at 690 after step 658.

FIG. 7 illustrates a data sharing method 700 that may be implemented after completion of all or portions of the method 600 of FIG. 6. For example, the data sharing systems 500 or 800 may be used to implement the method 700. At 704, the method 700 begins and initiation again may include setting fingerprint techniques to be used such that identical data objects will be processed to have identical fingerprints/file names, and step 704 may also include identifying communication protocols for use in broadcasting queries for data objects, for responding to data object requests, and for retrieving data objects from other devices once a data object is located within the data sharing system/network. At 710, the method 700 includes establishing a group of devices that will participate in a global namespace (e.g., by contributing data objects that may be shared/accessed by other devices and fingerprinting these objects in a consistent manner as other participating devices). The group of devices also will be communicatively linked, in a wired and/or wireless manner, to a digital communications network such as the Internet, an intranet, a WAN, a LAN, or the like.

At 720, the method 700 continues with a participating device identifying a need for one or more data objects and, in response, broadcasting a query for each data object. The fingerprint of the desired data object is provided in the query broadcast to all of the participating devices over the network, and each participating device may be configured such as during step 710 to include an I/O component that listens on the network for queries from one or more groups in which it is a participant. At step 730, the method 700 continues with the requesting device waiting (such was with a listening I/O component) for responses on the network from the participating devices. When a positive response is received at 730, the method 700 may continue at 736 with updating a listing of participating devices indicating which devices may be polled/contacted for retrieving each data object that was queried (and, the listing may also be updated to indicate negative responses to the broadcast query so as to track which devices do not have a particular data object). At step 740, the method may include the data manager or another module of the querying device acting to check if it requires additional data objects. If so, the method may continue at 720 with transmitting an additional query for another data object.

If not, the method 700 may continue at 750 with polling peers/participants that positively responded to the querie for one or more particular ones of the data objects. In contrast to the polling, the requests or retrieve commands for the particular data objects typically are targeted or directed commands/messages to peer devices in the data sharing network and provide the fingerprint of the requested data object. At 760, the method 700 continues with the peer device receiving the retrieval request/command, using the fingerprint to locate and retrieve the data object, and transmitting the data object to the requesting peer device. The requester device acts to receive the data object at 760. The manner in which the data objects are stored by each peer/participant device is not limiting to the invention. Each device simply has to be adapted to be able to look up the data objects using the fingerprint or instance data (e.g., a hash provide a data location and a CRC-based name component) and return the data in response to query and retrieve commands. For example, each device may include an IR configured as discussed above with reference to FIGS. 1-5, but this is not required to perform the method 700 of FIG. 7.

Data sharing systems and networks described herein may be operated so as to provide verified data integrity from untrusted devices (e.g., peers do not have to be closely integrated to share data). At 764, the method 700 is shown to include the receiving machine or device operating to verify the integrity of the received data object via a fingerprint comparison. For example, after a machine requests an object from another device, it may use its data manager module/software to validate integrity of the supplied data object by recomputing the fingerprint (e.g., operating the fingerprint generator mechanism/module on the supplied data object). The computed fingerprint may then be compared with the fingerprint used by the data manager in its query and data retrieve commands/messages to the supplying device. At 770, the method includes the comparator of the data manager determining whether the fingerprints match (or at least a portion matches such as all or a portion of the location component providing the segmented hash). If a match is not found, the method 700 may continue at 750 with the data, manager polling another device/peer that positively responded to the query at 730 for the particular data object (with this process repeated until a verifiable copy of the data object is received).

If the integrity is verified by a matching fingerprint at 770, the method 700 may continue at 772 with a determination by the data manager of whether more data objects are required. If so, the method 700 continues at 760, and if not, the method may continue at 780 with storing of the received (or shared/supplied) data objects in local memory (such as instances in a local or accessible IR or the like). The method 700 may continue (not shown) at 720 with further devices broadcasting queries or may end at 790. As can be seen, aspects of the inventive data sharing methods and systems decrease coordination and integration between the participating devices, but the methods and systems also increase assurance of data integrity by verifying the integrity of received data through the use of the unique fingerprints associated with each data object.

It may be useful at this point to describe use of these concepts of data sharing using data objects that are locatable via fingerprints in the context of disaster recovery. Generally, in such situations, the method 700 may be utilized with each device determining or reloading the fingerprints of the data objects that it previously held (prior to a loss of data) and then polling its peers for the actual data. The object data may come from any number of peer machines that each contain or store a subset of the lost data objects.

Figure 8:
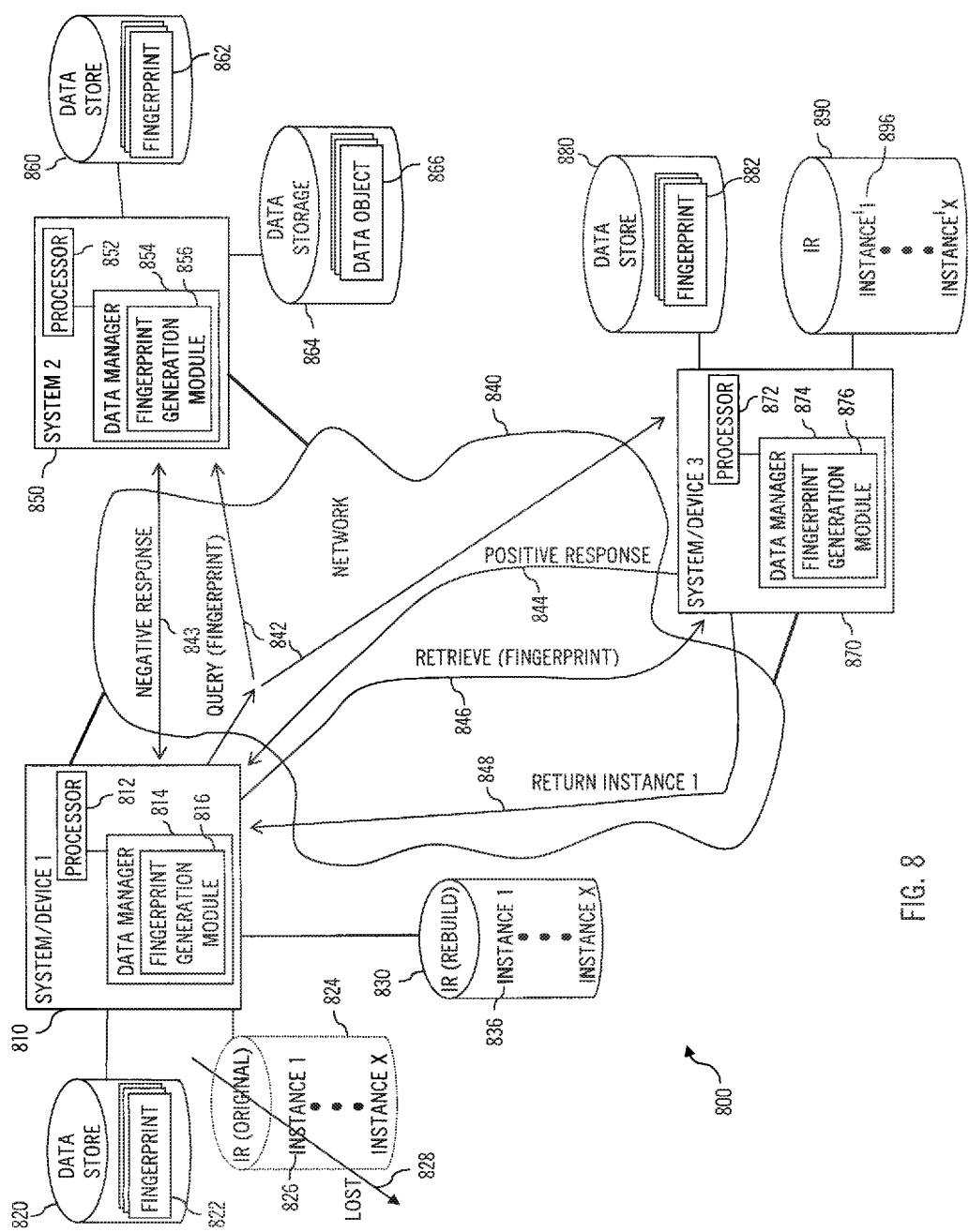
FIG. 8 is block diagram of a data storage system or network such as may be formed using the method of FIG. 6 with a recovery process illustrated that utilizes fingerprints of lost or damaged data objects to support recovery of the corresponding data, objects from one or more devices in the data storage system.

FIG. 8 illustrates a data sharing and recovery system 800 of an embodiment of the invention (shown in simplified form with three peer systems while a more typical system may include numerous peer devices including data object servers and non-data object servers). As shown, the system 800 includes three peer systems 810, 850, 870 that are communicatively linked via a digital communications network 840. Each system 810, 850, 870 includes a microprocessor(s) 812, 852, 872 running or executing code to provide a data manager 814, 854, 874, and a fingerprint generation module or software component 816, 856, 876 is provided in each manager 814, 854, 874 with a similar configuration to provide fingerprints (as discussed above) of one or more data objects in the systems 810, 850, 870.

As shown, the system 810 includes a data store or memory device 820 that is used to store a plurality of fingerprints 822 created by the fingerprint generation module 816 for instances 826 in its IR 824 (shown as the original IR in this disaster recovery context). The system 850 also includes a data store or memory 860 that is used to store fingerprints 862, and the system 850 may be a non-data object server device such that the fingerprints 862 are of data objects 866 in its data storage 864 that it has identified/selected for backup or other need for being able to obtain such data from the peers 810, 870 in system 800 (e.g., for data recovery, load balancing, or other reasons). The fingerprints 862 are created by the fingerprint generation module 856, which typically takes a form similar to that of module 816 such that like data objects 826, 866 would produce matching fingerprints. The system 870 may be a data object server with an IR 890 storing a plurality of instances 896 for data unique within its system 870, and the fingerprint generation module 876 may be used by the manager 874 to create fingerprints (e.g., a hash value or a hash value plus a naming component that may be a portion or all of the hash value or be its CRC in some cases) 882 that are stored in data store 880 for ready searching.

During operation of the system 800, an event 828 may occur that causes the loss of all or portions of the IR 824 to the system 810. A disaster recovery process may then be carried out by the data manager 814 that includes identifying the fingerprints 822 in the data store 820 that correspond to the lost instances 826 for use in creating or rebuilding an IR 836, and these may all or portions of the instances 826 and may be all or portions of the fingerprints 822. As part of disaster recovery, the manager 814 may act at 842 to broadcast a query with the fingerprint of each instance it requires (showing Instance 1 in FIG. 8 for example), and the query 842 is sent/addressed to all the peer systems 850, 870 in the data sharing system 800 (or those that are members of a peer group sharing a particular type or subset of data as differing devices on a network may be used to share differing sets of data in some applications). In some cases, the data sharing techniques described are used as a recovery method of last resort in that other primary data resources (such as trusted sources). For example, a large company with a worldwide network may need to retrieve data lost due to error or failure. With this invention and its data sharing/recovery techniques, the company could poll every (or a subset) of their storage devices in the worldwide network to see if any device has the data or data objects.

Each peer device 850, 870 may act to respond to a broadcast query for a data object. In this example, the system 850 may compare the query-provided fingerprint and determine that its fingerprints 862 do not include this particular fingerprint, which indicates none of its data objects 866 match the lost instance 826 corresponding to the query-provided fingerprint. In response, the data manager 856 may issue or transmit a negative response message or signal 843 to the data manager 814 of the system 810. In contrast, the data manager 874 may act to access its fingerprints 882 in data store 880 with the query-provided fingerprint and determine that it has a matching fingerprint, which indicates it also has a matching instance 896 (and its location in the store/IR 890 via the segmented hash value, in some embodiments).

Hence, the data manager 874 may act to transmit a positive response at 844 to the data manager 814 of the requesting system 810. The data manager 814 may then act to send as shown at 846 a targeted message such as a retrieve message with the fingerprint of the instance (e.g., Instance 1 fingerprint) to the system 870. The data manager 874 may act to use the retrieve-provided (or poll-provided) fingerprint to retrieve from its IR or data storage 890 a copy of the corresponding one of the instances 896 (e.g., a copy of Instance 1 in this case). The data manager 874 then transmits as shown at 848 a copy of the data object (e.g., Instance 1) corresponding to the fingerprint to the system 810.

The data manager 814 may then act to verify the integrity of the received/returned data object by using its fingerprint generation module 816 to produce a fingerprint of the instance/data object and then comparing this fingerprint with the fingerprint it used in its retrieve/request message 846. If a match is found (e.g., hash and CRC match or the like), the instance/data object is stored as shown at 836 in the rebuild or recovered IR 830. If not, a new retrieve message 846 may be sent to another peer device providing a positive response to the query for the particular data object. This process is continued for each data object (in parallel or sequentially) that was lost until data recovery is completed by the data manager 814 (or other data recovery modules/mechanisms in the system 810). Hence, as long as a device is able to provide fingerprints of one or more data objects, it is able to recover those data objects from other peers in the system 800. Such recovery may be selective in that a full recovery of all data is not always required, but, instead, the file managers may determine that only a set or plurality of data objects has been lost. These particular data objects/instances may be rebuilt by the data sharing techniques described herein by supplying fingerprints associated with the desired data objects/instances in broadcast queries and later targeted retrieve messages.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. Data deduplication is a standard feature in many data protection appliances and applications. By implementing deduplication using the methods (including the fingerprinting techniques and IR storage techniques) described herein, storage products such as Sun Microsystems, Inc.'s Virtual Tape Library (VTL), Archive, Amber Road, and the like may be enhanced to provide a more efficient file management service including improved data reduction and data sharing/recovery.

Product advantages when including modules performing, the described methods may include creating a global namespace in which unique data may be stored. This namespace allows systems to easily consolidate instance repositories from multiple systems as well as replicate the repository to a central location. The method may result in a significant decrease in the processing required to identify duplicate data and store unique instances/data. Use of the method(s) may also increase the speed of locating and accessing unique instances during restore or other data access operations.

Embodiments of the subject matter described in this specification can be implemented as one or more computer program products, i.e., one or more modules of computer program instructions encoded on a computer-readable medium for execution by, or to control the operation of, data processing apparatus. For example, the modules used to provide the data reduction service 120 such as the fingerprint, generation module and to provide data management system 520 with modules 532, and the like may be provided in such computer-readable medium and executed by a processor or the like. The computer-readable medium can be a machine-readable storage device, a machine-readable storage substrate, a memory device, a composition of matter affecting a machine-readable propagated signal, or a combination of one or more of them. The term "data management system" and computer systems used to provide a data reduction or deduplication service encompasses all apparatus, devices, and machines for processing data, including by way of example a programmable processor, a computer, or multiple processors or computers. The system (such as systems 100 and 500 of FIGS. 1 and 5) can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) used to provide the functionality described herein (such as to provide data management and/or fingerprint generation including a hash function, a CRC mechanism, and the like) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Generally, the elements of a computer are a processor for performing instructions and one or more memory devices for storing instructions and data. The techniques described herein may be implemented by a computer system configured to provide the functionality described.

For example, FIG. 5 is a block diagram illustrating one embodiment of a computer system 500 configured to implement the methods described herein. In different embodiments, computer system 500 may be any of various types of devices, including, but not limited to a personal computer system, desktop computer, laptop, notebook, or netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or, in general, any type of computing or electronic device.

Typically, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, a digital camera, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry. To provide for interaction with a user (with an I/O portion 524 of system 520 or the like), embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory, feedback, e.g., visual feedback, auditory feedback, or tactile feedback; and input from the user can be received in any form, including acoustic, speech, or tactile input.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

We claim:

1. A data sharing method, comprising:
communicatively linking a plurality of computer devices via a communications network, wherein each of the computer devices includes a data storage storing a plurality of data objects;

providing a fingerprint generation module on each of the computer devices;

with each of the computer devices, processing each data object of at least a portion of the data objects in the data storage with the fingerprint generation module to generate a fingerprint for the data object, wherein the fingerprints are stored in a searchable manner in a data store, wherein each fingerprint comprises a hash value that is output from a hashing algorithm run on an associated one of the data objects, wherein the fingerprint generation module parses the hash value into a plurality of sub-strings, wherein each of the plurality of sub-strings defines a corresponding sub-directory in a directory structure of a data storage, and wherein the sub-directories define a location for an instance of the associated one of the data objects; and with a data manager on one of the computer devices, retrieving from another one of the computer devices a copy of one of the data objects in the data storage associated with the one of the computer devices using the fingerprint generated for the one of the data objects.

2. The method of claim 1, wherein a hash value is a first component of each of the fingerprints, and wherein each fingerprint further comprises a second component generated by performing a cyclic redundancy check (CRC) function on the associated data object.

3. The method of claim 1, wherein the retrieving of one of the data objects comprises transmitting a query providing the fingerprint for the one of the data objects to the computer devices over the communications network.

4. The method of claim 3, wherein the retrieving of one of the data objects further comprises receiving a message from a particular one of the computer devices indicating the provided fingerprint matches one of the fingerprints generated by the particular one of the computer devices and, in response, sending a retrieve message with the fingerprint for the one of the data objects to the particular one of the computer devices.

5. The method of claim 4, wherein the retrieving of one of the data objects further comprises receiving a data object from the particular one of the computer devices and verifying integrity of the received data object by using the fingerprint generation module to generate a new fingerprint and comparing the new fingerprint with the fingerprint provided to the particular one of the computer devices.

6. The method of claim 1, wherein a hash value is a location component of each of the fingerprints.

7. The method of claim 1, wherein the fingerprint generation modules of first and second of the plurality of computer devices generate a same hash value for a first data object, wherein the fingerprint generation module of the first computer device parses the hash value into a first number of sub-strings, wherein the fingerprint generation module of the second computer devices parses the hash value into a second number of sub-strings, and wherein the first number is different than the second number.

8. The method of claim 2, wherein the second component of each fingerprint comprises a name component of a file that is located in the directory structure by the sub-directories of an associated data object.

9. A data recovery method, comprising:

with at least one microprocessor, executing at least one fingerprint generation module to process a plurality of data objects to define a fingerprint for each of the data objects, wherein each of the fingerprints comprises a hash value for an associated one of the data objects, wherein the fingerprint generation module is executed to parse the hash value into a plurality of sub-strings, wherein each of the plurality of sub-strings defines a corresponding sub-directory in a directory structure of a data storage device, and wherein the sub-directories define a location for an instance of the associated one of the data objects;

storing the data objects in a distributed manner in data storage devices of a plurality of peer devices linked to a network, wherein each of the data storage devices stores a subset of the data objects with at least some of the subsets storing differing ones of the data objects;

storing the fingerprints associated with each of the subsets of the data objects in memory accessible by one of the peer devices associated with one of the data storage devices storing one of the subsets of the data objects;

responsive to a loss of at least a portion of one of the data object subsets from one of the data storage devices, operating a data manager at an associated peer device to recover the portion of the one of the data object subsets, wherein the operating comprises:

retrieving, from the memory, the fingerprints associated with the portion of the one of the data object subsets to be recovered; and transmitting query messages to the peer devices to locate the portion of the one of the data object subsets to be recovered, wherein each query message includes the retrieved fingerprints.

10. The method of claim 9, wherein each of the peer devices receiving the query messages compares the fingerprints in the query messages with the fingerprints stored in its associated accessible memory and provides a responsive message indicating located ones of the data objects.

11. The method of claim 10, further comprising:

operating the data manager, for each of the data objects being recovered, to direct a retrieve message with one of the fingerprints of the data objects being recovered to one of the peer devices providing the responsive messages.

12. The method of claim 11, further comprising:

with the data manager, receiving the data objects being recovered from the peer devices and, prior to storing the received data objects, verifying integrity by using one of the fingerprint generation modules to generate a fingerprint for each received data object and comparing the generated fingerprints with the fingerprints stored in the memory.

13. The method of claim 9, wherein the fingerprint generation module comprises a strong hashing algorithm producing the hash value.

14. A data sharing and recovery system comprising:

a communications network; and a plurality of peer systems each including a processor providing a data manager with a fingerprint generation module, wherein each of the peer systems is linked to the communications network for communicating with other ones of the peer systems;

wherein each of the peer systems includes a repository storing a number of data objects; and wherein each of the peer systems includes a data store storing a fingerprint generated by the fingerprint generation module for each of the data objects in the associated peer system repository, wherein each fingerprint comprises a location component generated based on an output of a hash function applied to an associated one of the data objects, wherein the hash function output is parsed to divide it into a number of segments, and wherein the number of segments are used to define a respective number of nodes in the repository which collectively represent a file path for the associated one of the data objects.

15. The system of claim 14, wherein the fingerprint generation modules each utilize the same hash function.

16. The system of claim 14, wherein the data objects stored differ for at least some of the peer systems.

17. The system of claim 14, wherein at least one of the data managers operates to initiate data sharing by transmitting a query over the communications network to other ones of the peer systems, the query comprising the fingerprint of one of the data objects in the peer systems repository associated with the one of the data managers.

18. The system of claim 17, wherein the one of the data managers further operates to poll a first of the peer systems with the fingerprint of the one of the data objects to retrieve a copy of the one of the data objects.

19. The system of claim 18, wherein the one of the data managers further operates to operate the fingerprint generation module to generate a fingerprint of the received copy of the one of the data objects and further operates to verify integrity by comparing the fingerprint of the received copy with the fingerprint used in the polling step.

* * * * *

UNITED STATES PATENT AND TRADEMARK OFFICE
CERTIFICATE OF CORRECTION

| | | |
|---|---|---|
| PATENT NO. | : 8,121,993 B2 | Page 1 of 1 |
| APPLICATION NO. | : 12/607583 | |
| DATED | : February 21, 2012 | |
| INVENTOR(S) | : Blount et al. | |

It is certified that error appears in the above-identified patent and that said Letters Patent is hereby corrected as shown below:

Column 6, line 17, delete "an" and insert therefor --all--.
Column 15, line 51, delete "querie" and insert therefor --queries--.

Signed and Sealed this
Tenth Day of April, 2012

David J. Kappos
*Director of the United States Patent and Trademark Office*